(12) United States Patent
Shoda et al.

(10) Patent No.: US 9,591,202 B2
(45) Date of Patent: Mar. 7, 2017

(54) IMAGE PROCESSING APPARATUS AND IMAGE PROCESSING METHOD FOR GENERATING RECOMPOSED IMAGES

(71) Applicant: CANON KABUSHIKI KAISHA, Tokyo (JP)

(72) Inventors: Satoshi Shoda, Utsunomiya (JP); Yohei Horikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/641,821

(22) Filed: Mar. 9, 2015

(65) Prior Publication Data

US 2015/0264249 A1 Sep. 17, 2015

(30) Foreign Application Priority Data

Mar. 14, 2014 (JP) .................................. 2014-052357

(51) Int. Cl.
*H04N 5/232* (2006.01)
*G02B 13/00* (2006.01)

(52) U.S. Cl.
CPC ..... *H04N 5/23212* (2013.01); *G02B 13/0015* (2013.01); *H04N 5/23232* (2013.01); *H04N 5/23293* (2013.01)

(58) Field of Classification Search
CPC ........... H04N 5/23212; H04N 5/23232; H04N 5/23293; G02B 13/0015
See application file for complete search history.

(56) References Cited

U.S. PATENT DOCUMENTS

| | | | |
|---|---|---|---|
| 8,400,555 B1 * | 3/2013 | Georgiev | H04N 5/23212 348/222.1 |
| 9,148,582 B2 * | 9/2015 | Nestares | H04N 5/23222 |
| 9,344,619 B2 * | 5/2016 | Shroff | G06T 7/0051 |
| 2008/0131019 A1 * | 6/2008 | Ng | G06T 5/001 382/255 |
| 2013/0044254 A1 * | 2/2013 | Tzur | G06T 7/0069 348/345 |

(Continued)

FOREIGN PATENT DOCUMENTS

JP    2007-004471 A    1/2007
JP    4027113 B    12/2007

*Primary Examiner* — Nicholas Giles
(74) *Attorney, Agent, or Firm* — Cowan, Liebowitz & Latman, P.C.

(57) ABSTRACT

An image processing apparatus for processing imaging data, which is capable of generating a plurality of recomposed images respectively in focus at different subject distances, the image processing apparatus including an acquisition unit configured to acquire time-series imaging data capable of generating the recomposed image; a focal plane determination unit configured to determine a position of a focal plane in processing for generating the recomposed image; and a generation unit configured to generate recomposed-image data at the position of the focal plane determined by the focal plane determination unit, wherein the focal plane determination unit determines the position of the focal plane in the processing for generating the recomposed image based on the positions of the focal plane respectively corresponding to the time-series imaging data on which the processing for generating the recomposed image is to be performed.

9 Claims, 10 Drawing Sheets

(56) References Cited

U.S. PATENT DOCUMENTS

| | | | | |
|---|---|---|---|---|
| 2013/0216199 A1* | 8/2013 | Nakajima | .......... | H04N 5/23212 386/224 |
| 2013/0335618 A1* | 12/2013 | Sugawara | .......... | H04N 5/23212 348/349 |
| 2014/0049666 A1* | 2/2014 | Tsutsumi | ............. | H04N 5/2621 348/239 |
| 2015/0146032 A1* | 5/2015 | Rime | ....................... | H04N 7/01 348/222.1 |

* cited by examiner

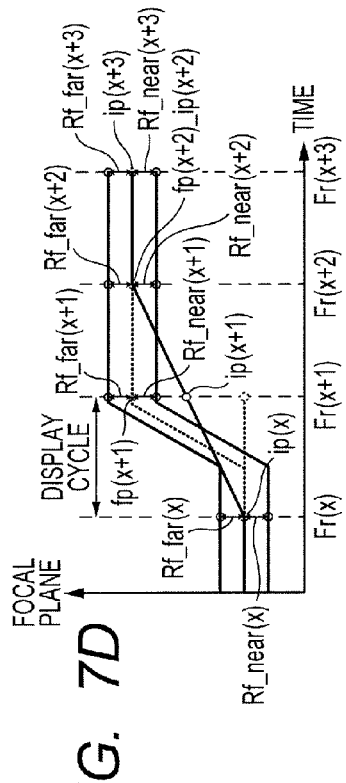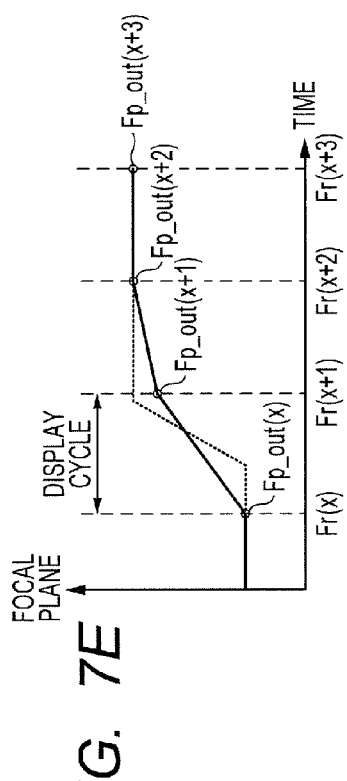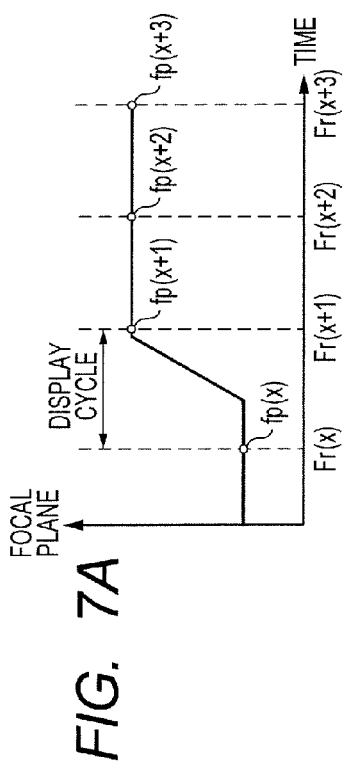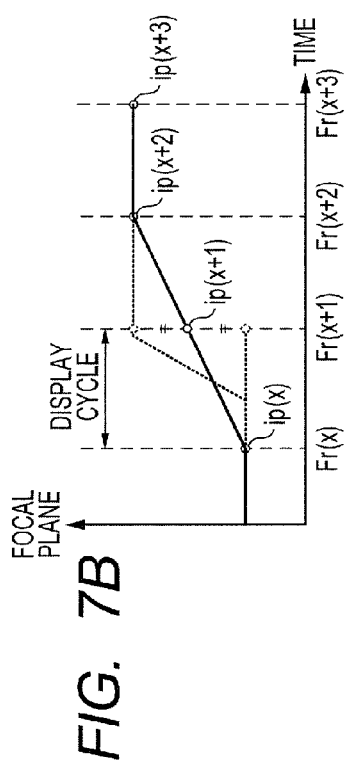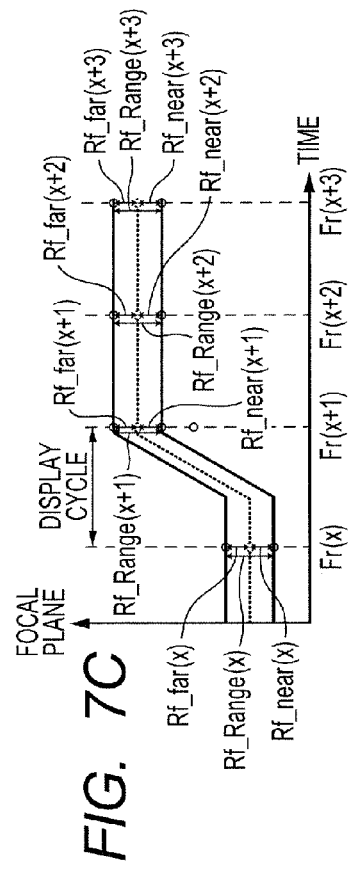
FIG. 7A  FIG. 7B  FIG. 7C  FIG. 7D  FIG. 7E FIG. 8A
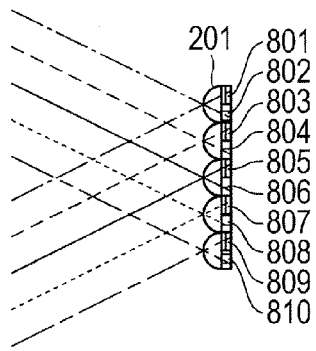
FIG. 8B
| 809 | 807 | 805 | 803 | 801 |
|-----|-----|-----|-----|-----|
| 810 | 808 | 806 | 804 | 802 |
FIG. 8C
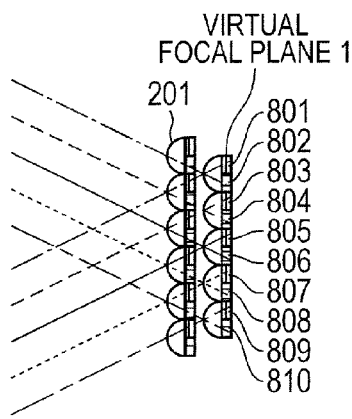
FIG. 8D
| | 809 | 807 | 805 | 803 | 801 |
|---|---|---|---|---|---|
| 810 | 808 | 806 | 804 | 802 | |
FIG. 8E
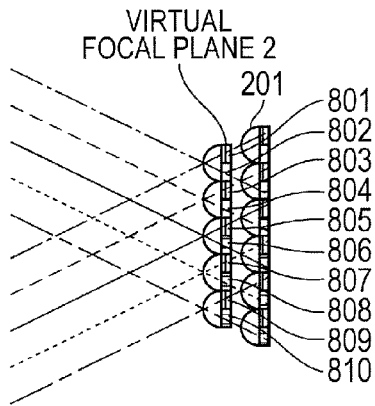
FIG. 8F
| 809 | 807 | 805 | 803 | 801 | |
|---|---|---|---|---|---|
| | 810 | 808 | 806 | 804 | 802 |

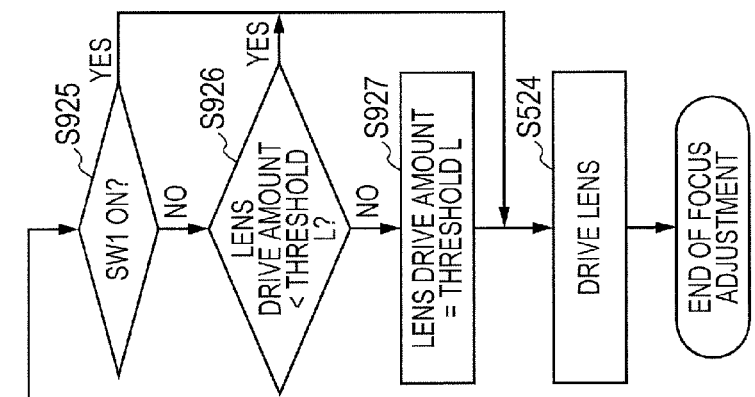
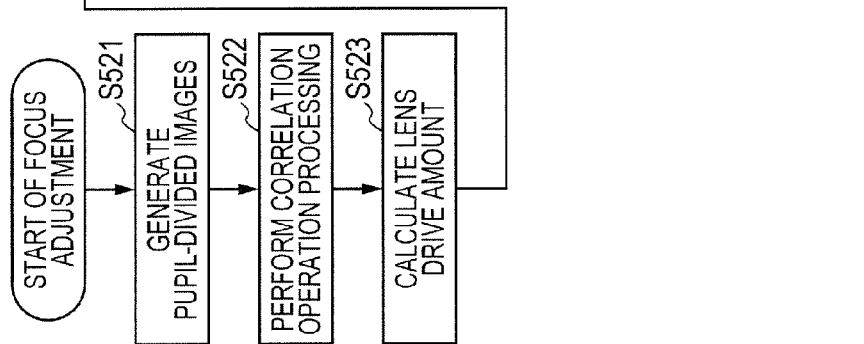
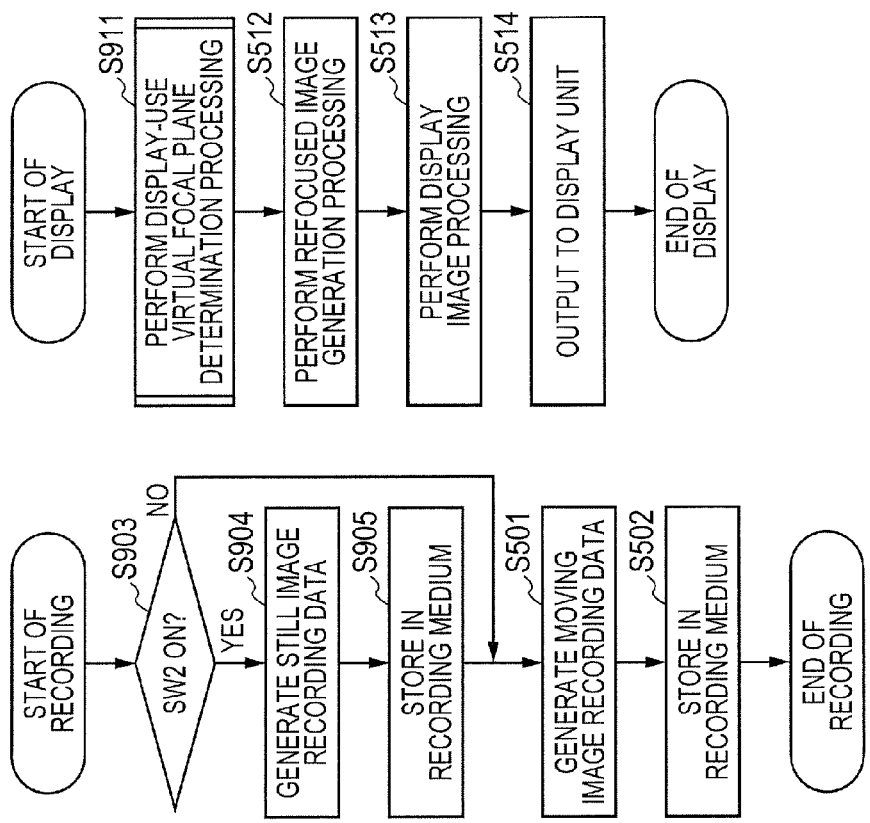

IMAGE PROCESSING APPARATUS AND IMAGE PROCESSING METHOD FOR GENERATING RECOMPOSED IMAGES

BACKGROUND OF THE INVENTION

Field of the Invention

The present invention relates to an image processing apparatus and an image processing method.

Description of the Related Art

Image pickup apparatus having a function of photographing a moving image in addition to a function of photographing a still image have appeared as recent digital single-lens reflex cameras. Some of the digital single-lens reflex cameras have a function of enabling still-image photographing during moving image photographing. Further, a digital camera capable of photographing a moving image generally includes a liquid crystal display mounted on a back surface thereof. A photographer can photograph a subject which is a target to be photographed while observing the subject through the liquid crystal display mounted on the back surface.

Further, there is known an autofocus (hereinafter referred to as "AF") technology of automatically performing a focus adjustment operation for focusing on a predetermined region when a moving image and a still image are photographed. The AF technology is roughly classified into a phase detection AF technology and a contrast AF technology.

The phase detection AF is an autofocus method of splitting a light flux which enters through a lens and detecting a phase shift between images respectively generated by she light fluxes so that focus is adjusted in accordance with the detected phase shift. In Japanese Patent No. 4027113, there is disclosed a technology of forming a plurality of photoelectric conversion units for each pixel to perform pupil-division on an image pickup plane so as to realize the phase detection AF.

The contrast AF is an autofocus method of acquiring an image while moving a lens and driving the lens using a lens position at which an amplitude of contrast of the image has a peak as a point of focus.

There is also known a technology capable of obtaining (recomposing) an image which is in focus on a point at a different distance in the same depth of field, from image data obtained by single photographing. In Japanese Patent Application Laid-Open No. 2007-4471, there is disclosed a technology of photographing light fluxes passing through different regions of an exit pupil of an imaging optical system and then combining image data respectively obtained by the light fluxes passing through the different regions so as to generate image data of an image on an arbitrary image plane by single photographing.

SUMMARY OF THE INVENTION

According to one aspect of an embodiment, an image processing apparatus for processing imaging data, which is capable of generating a plurality of recomposed images respectively in focus at different subject distances, the image processing apparatus including an acquisition unit configured to acquire time-series imaging data capable of generating the recomposed image; a focal plane determination unit configured to determine a position of a focal plane in processing for generating the recomposed image; and a generation unit configured to generate recomposed-image data at the position of the focal plane determined by the focal plane determination unit, wherein the focal plane determination unit determines the position of the focal plane in the processing for generating the recomposed image based on the positions of the focal plane respectively corresponding to the time-series imaging data on which the processing for generating the recomposed image is to be performed.

Further features of the present invention will become apparent from the following description of exemplary embodiments with reference to the attached drawings.

BRIEF DESCRIPTION OF THE DRAWINGS

FIGS. 7A, 7B, 7C, 7D, and 7E are graphs showing a configuration for determining a display-use virtual focal plane according to the first embodiment of the present invention.

FIGS. 8A, 8B, 8C, 8D, 8E, and 8F are diagrams illustrating refocusing processing.

FIGS. 9A, 9B, and 9C are flowcharts illustrating a moving image photographing operation performed in a case where the image processing apparatus according to a second embodiment of the present invention is applied to the image pickup apparatus illustrated in FIG. 1.

DESCRIPTION OF THE EMBODIMENTS

When autofocusing is performed in an image pickup apparatus capable of photographing a moving image, there are the following problems.

When phase detection AF is used for moving image photographing, lens driving operation and stop operation are performed continuously at high speed. Therefore, the phase detection AF has a problem in that moving image quality is lowered.

On the other hand, when contrast AF is used for moving image photographing, the lens operates so as to once pass through a point of focus on a subject, thereby determining a contrast peak. Therefore, the contrast AF has a problem in that quality of a moving image which is being displayed is lowered.

Further, to a lens-interchangeable camera such as a related-art single-lens reflex camera, a lens which is designed mainly for still-image photographing can be mounted. A driving speed and a driving interval of the lens which is designed mainly for still-image photographing as described above are not always suitable for moving images.

Now, exemplary embodiments of the present invention are described in detail referring to the accompanying drawings.

First Embodiment

An image pickup apparatus to which an image processing apparatus according to a first embodiment of the present invention is applied is described below referring to FIGS. 1 to 8F. The image pickup apparatus of the present invention is a digital camera, a video camera, or the like. However, it is needless to say that the image processing apparatus according to this embodiment is also applicable to an information processing apparatus such as a PC, for processing an output of a multiple-lens camera or a camera capable of acquiring light-field data.

Figure 1:
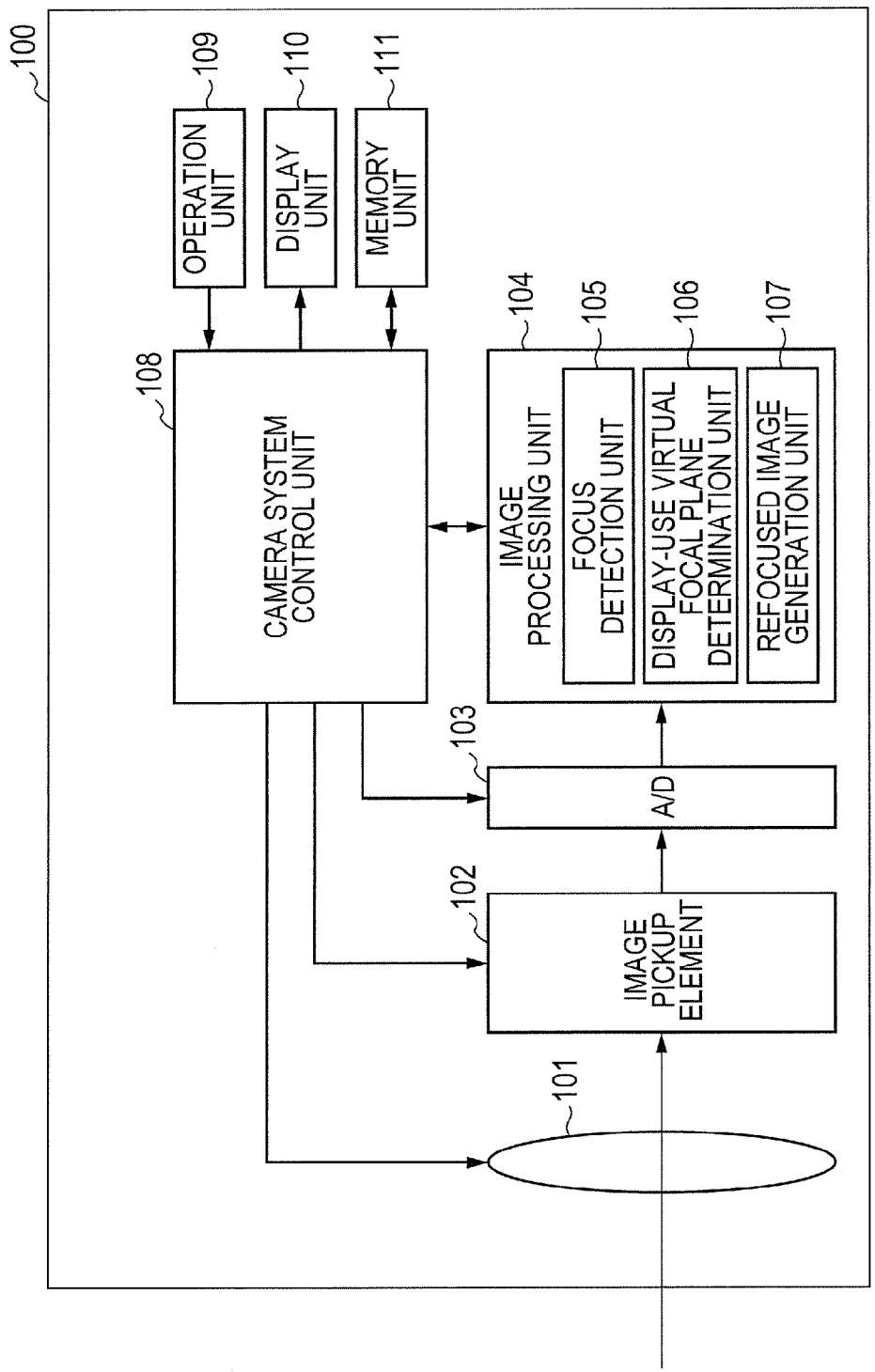
FIG. 1 is a block diagram illustrating a configuration of an image pickup apparatus to which an image processing apparatus according to embodiments of the present invention is applied.

FIG. 1 is a block diagram illustrating a configuration of an image pickup apparatus 100 to which the image processing apparatus according to this embodiment is applied.

FIG. 1 illustrates an image pickup optical system 101 including a focus lens. The image pickup optical system 101 guides light from a subject to an image pickup element 102 through a plurality of lens groups and a diaphragm to form a subject image on the image pickup element 102. The focus lens included in the image pickup optical system 101 is driven based on a driving instruction from a lens driving control, unit (not shown) or a rotating operation of a focusing ring. By the driving of the focus lens, a point of focus can be adjusted.

In the image pickup element 102, a plurality of microlenses are arranged in a lattice pattern. Below each of the microlenses, a plurality of photoelectric conversion units are arranged. Each of the microlenses pupil-divides a light flux passing through an exit pupil of the image pickup optical system 101. The plurality of photoelectrical conversion units are designed so as to receive the light fluxes pupil-divided by the microlenses. A detailed configuration of the image pickup element 102 is described later.

An A/D conversion unit 103 converts an analog signal output from the image pickup element into a digital signal.

An image processing unit 104 includes circuits and a program group which have an image processing function and include a focus detection unit 105, a display-use virtual focal plane determination unit 106, and a refocused image generation unit 107 described later. The image processing unit 104 performs predetermined image processing on imaging data output from the A/D conversion unit 103 based on a control instruction from a camera system control unit 108, to thereby generate image data for recording and image data for display.

The focus detection unit 105 is a program for performing a correlation operation based on the imaging data obtained through the A/D conversion unit 102 so as to calculate an evaluation value to be used for lens position adjustment. The evaluation value calculated by the focus detection unit 105 is converted into a lens driving instruction through the camera system control unit 108. The obtained lens driving instruction is used to drive the image pickup optical system 101. A detailed operation of the focus detection unit 105 is described later.

The display-use virtual focal plane determination unit 106 is a program for determining a position of a focal plane which is used to form the image data for display. The display-use virtual focal plane determination unit 106 is described in detail later.

The refocused image generation unit 107 is a circuit for generating an image on a focal plane (virtual focal plane) different from the actual focal plane (the image is hereinafter referred to as "refocused image" or "recomposed image") by performing combining processing on the imaging data output from the A/D conversion unit 103. A detailed operation of the refocused image generation unit 107 is described later.

The camera system control unit 108 not only controls an operation of the entire image pickup apparatus but also acquires data obtained by image processing and lens position information of the image pickup optical system 101 to function to intermediate the transmission of data between blocks. A control program and necessary data for the camera system control unit 108 are stored in advance in a memory (not shown).

An operation unit 109 is an operation member such as various switches or dials mounted to the image pickup apparatus 100. A photographer can set photographing parameters and control a photographing operation by using the operation unit.

A display unit 110 is a liquid crystal display such as an LCD. The display unit 110 displays an image obtained by photographing, the image data stored in a memory unit 111, and various setting screens.

The memory unit 111 is a recording medium such as an SD card or a compact flash. The memory unit 111 records the image data generated by the image processing unit 104.

Figure 2A:
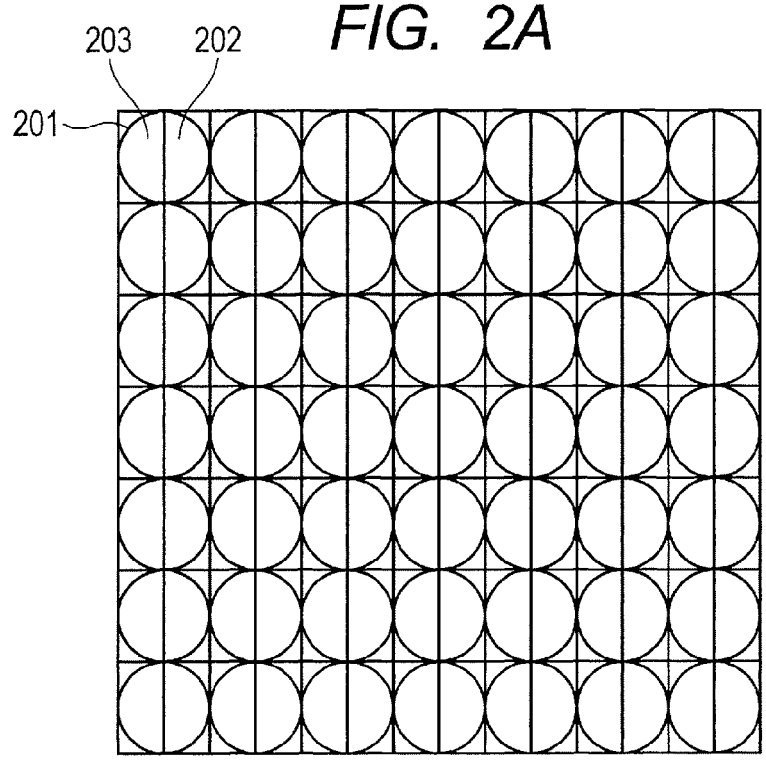
FIGS. 2A, 2B, and 2C are views illustrating a configuration of an image pickup element to be used in the image pickup apparatus illustrated in FIG. 1.
Figure 2B:
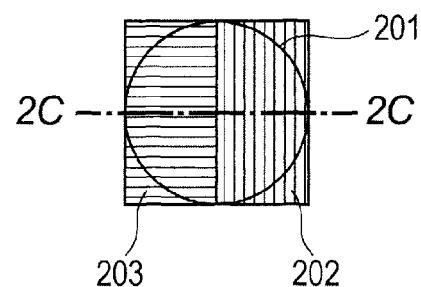
Figure 2C:
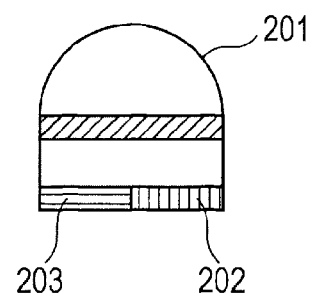
Figure 3:
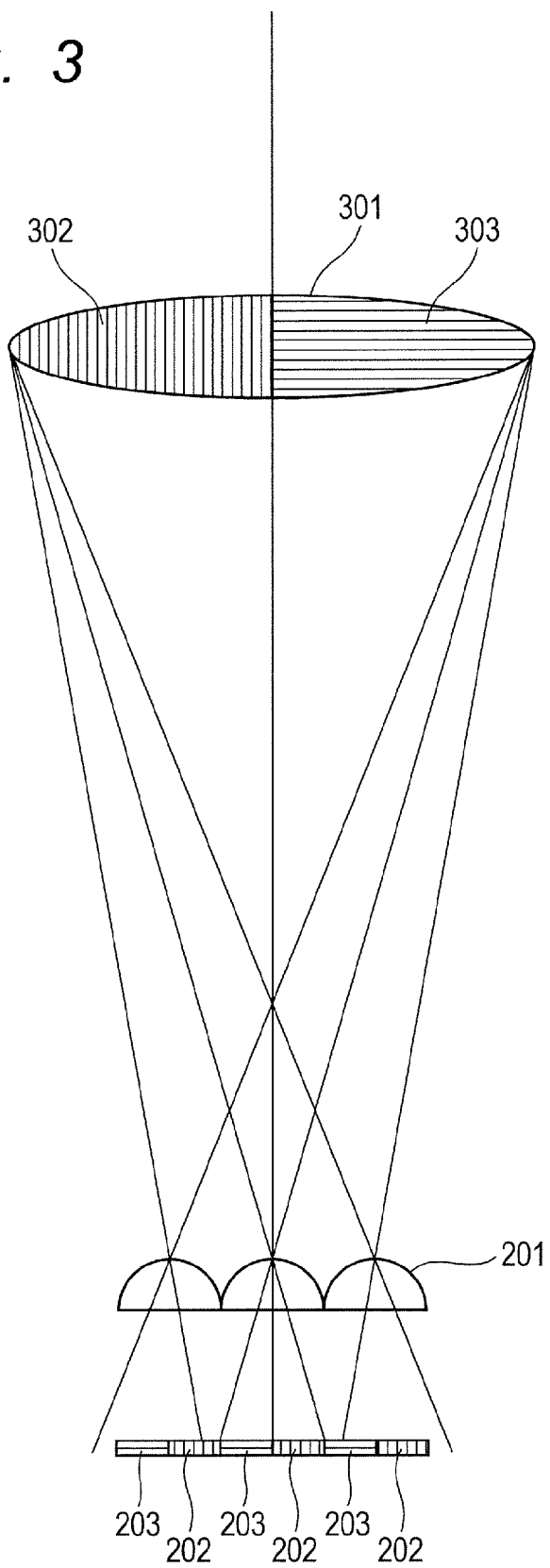
FIG. 3 is a diagram illustrating a relationship between division pixels included in the image pickup element illustrated in FIGS. 2A to 2C and incident light.

Next, a configuration of the image pickup element. 102 included in the image pickup apparatus 100 is described referring to FIGS. 2A to 3.

FIG. 2A is an enlarged view of a partial region of the image pickup element 102 and illustrates a correspondence relationship between a microlens array and pixels. The circle in FIG. 2A represents a microlens 201. The rectangular region corresponding to the microlens 201 represents a pixel. In the image pickup element 102, the microlenses 201 and the pixels are arranged two-dimensionally.

Next, a configuration of the pixel is described.

FIG. 2B is a view of one pixel of the image pickup element 102 as viewed from above. FIG. 2C is a sectional view of the pixel taken along the line 2C-2C illustrated in FIG. 2B. In FIGS. 2A to 2C, the same components are denoted by the same reference symbols.

In FIGS. 2A to 2C, the microlenses 201 are arranged in the vicinity of an imaging plane of the image pickup optical system 101 and condenses light fluxes output from the image pickup optical system. As illustrated in FIGS. 2A to 2C, photoelectric conversion units 202 and 203 are arranged. Now, the photoelectric conversion units 202 and 203 are referred to as "division pixels".

As illustrated in FIG. 3, the division pixels 202 and 203 respectively receive light fluxes passing through different regions 302 and 303 of an exit pupil 301 of the image pickup optical system 101. In this embodiment, a photoelectric conversion unit is divided into two to form the division pixels. However, the range of application of the present invention is not limited thereto. Any configuration may be used as long as the light fluxes passing through different regions of the exit pupil are independently received.

Next, an operation of the camera system control unit 108, which is performed during moving image photographing, is described referring to FIGS. 4 to 8F.

Figure 4:
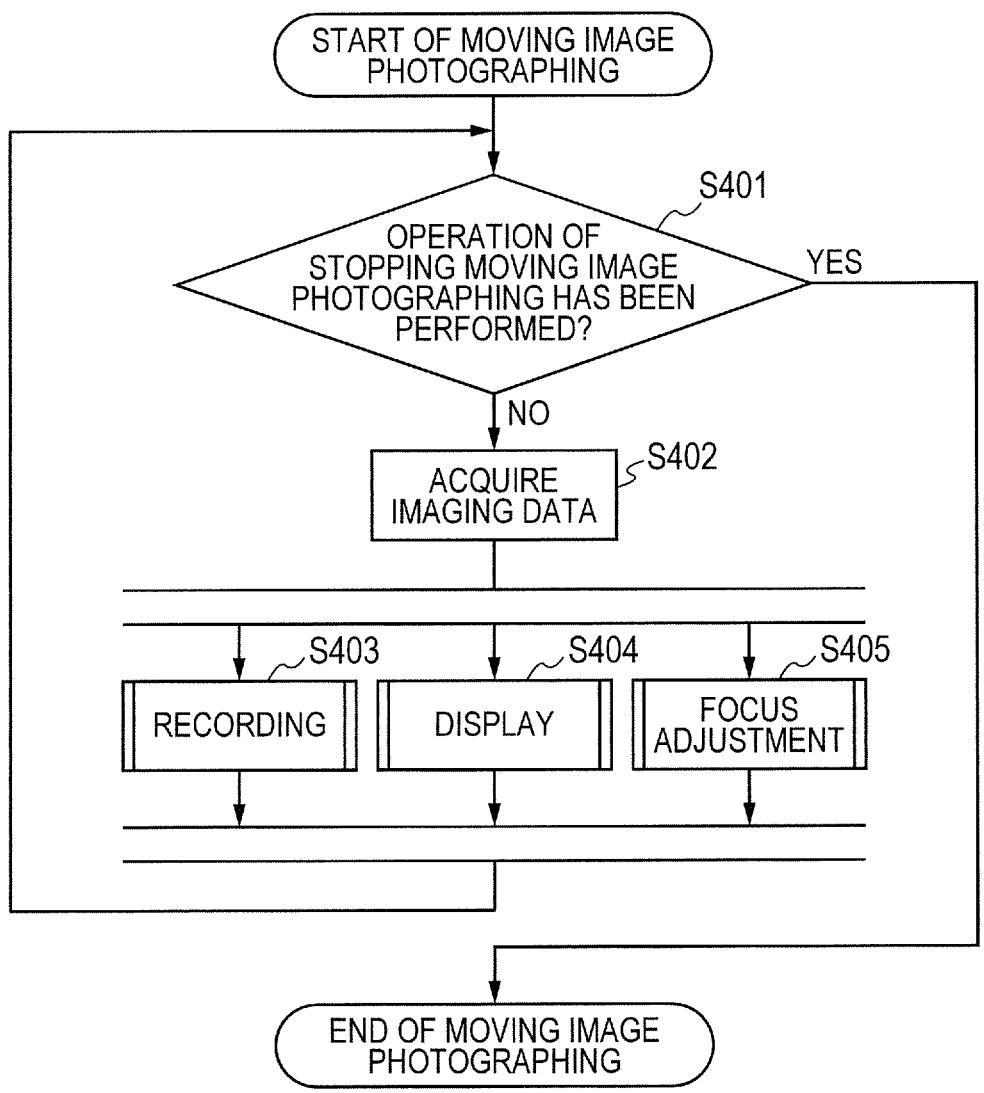
FIG. 4 is a flowchart illustrating a moving image photographing operation performed in a case where the image processing apparatus according to a first embodiment of the present invention is applied to the image pickup apparatus illustrated in FIG. 1.

FIG. 4 is a flowchart illustrating a control operation during the moving image photographing, which is performed in the image pickup apparatus 100.

After an operation of starting moving image photographing is executed by the operation unit 109, the image pickup apparatus 100 executes the following moving image recording flow. The control operation is performed by execution of the control program stored in advance in the memory (not shown) by the camera system control unit 108.

In FIG. 4, in Step S401, the camera system control unit 108 determines whether or not an operation of stopping the moving image photographing has been performed by the operation unit 109. When it is determined in Step S401 that the operation of stopping the moving image photographing has been performed, the camera system control unit 108 terminates the moving image photographing operation. On the other hand, when it is determined in Step S401 that the operation of stopping the moving image photographing has not been performed, the processing proceeds to Step S402.

In imaging data acquisition performed in Step S402, the camera system control unit 108 controls the driving of the image pickup element 102 and the A/D conversion unit 103 to acquire the imaging data of a region to be photographed.

Next, in Steps S403 to S405, the camera system control unit 108 controls the image processing unit 104 to execute processing in Steps S403 to S405 in parallel.

Details of recording processing in Step S403, display processing in Step S404, and focus adjustment processing in Step S405 are described later. The processing in Steps S403, S404, and S405 is repeated until the operation of stopping the moving image photographing is performed.

Next, the detailed processing contents of Steps S403 to S405 are described.

Figure 5C:
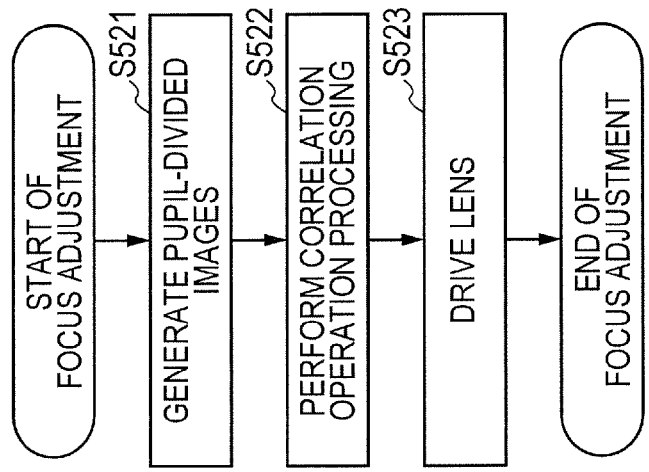
FIGS. 5A, 5B, and 5C are detailed flowcharts of the moving image photographing operation illustrated in FIG. 4.
Figure 5B:
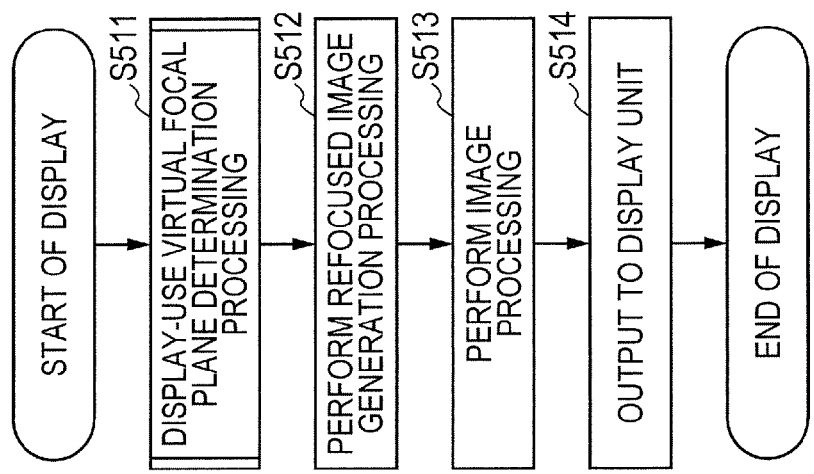
Figure 5A:
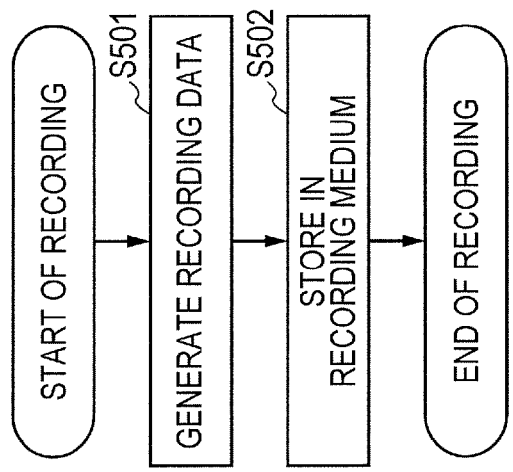

FIGS. 5A to 5C are flowcharts of the processing in Steps S403 to S405 illustrated in FIG. 4, respectively.

First, she recording processing in Step S403 is described referring to FIG. 5A.

After the recording processing is started, the camera system control unit 108 controls the image processing unit to convert the imaging data acquired in Step S402 into data in a predetermined format for compression to generate the data for recording.

Next, in Step S502, the camera system control unit 108 records the data for recording, which is generated in Step S501, in the memory unit 111 inserted into a recording medium slot (not shown) of the image pickup apparatus 100. Then, the camera system control unit 108 terminates the recording processing.

Next, an operation of generating display data and controlling display, which is performed in Step S404, is described referring to FIGS. 5B to 7E.

After the display processing is started, display-use virtual focal plane determination processing is first performed by the display-use virtual focal plane determination unit 106 in Step S511.

Figure 6:
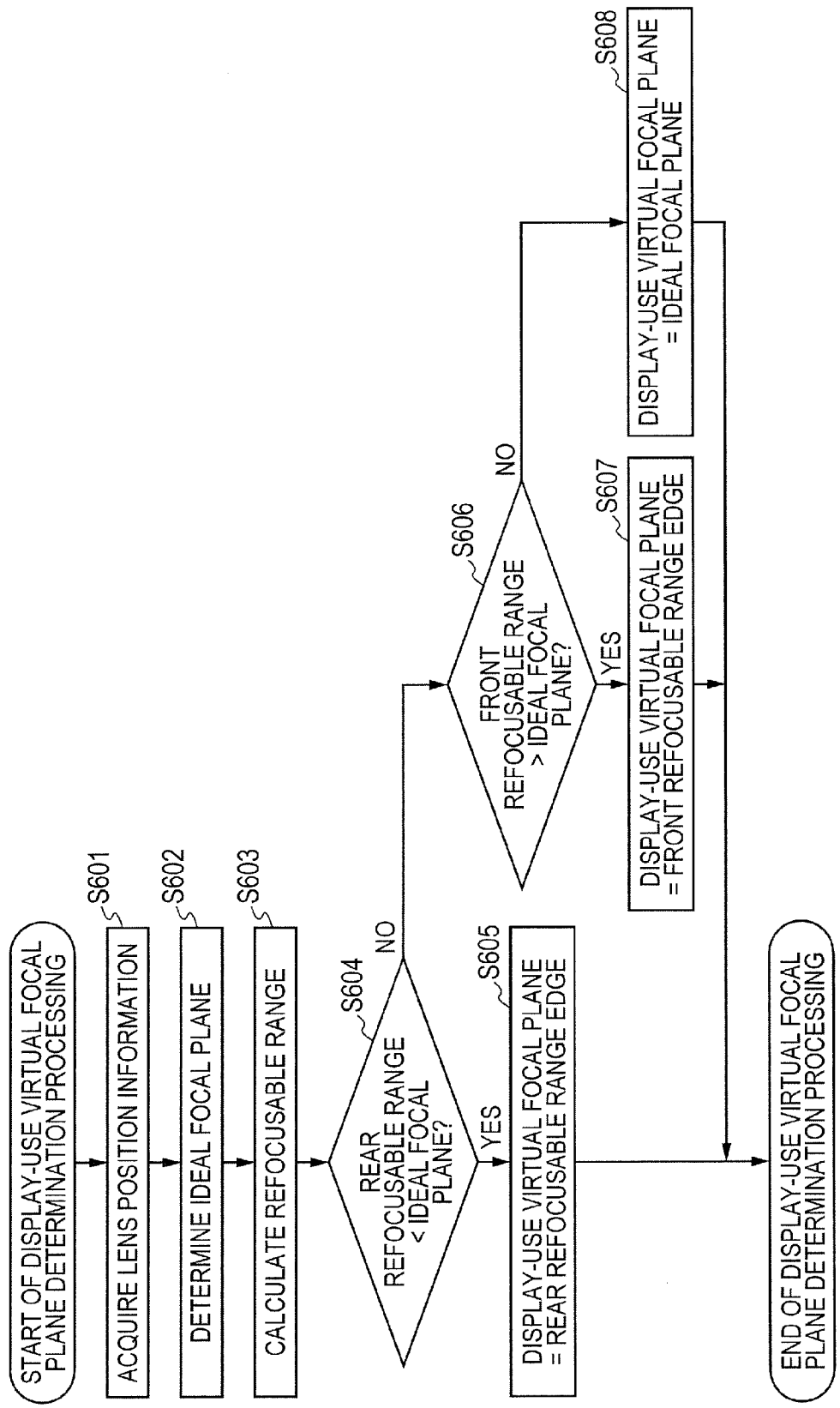
FIG. 6 is a flowchart illustrating a virtual focal plane determination operation according to the first embodiment of the present invention.

FIG. 6 is a flowchart illustrating a detailed operation of the display-use virtual focal plane determination processing. The operation of the display-use virtual, focal plane determination processing is performed by the display-use virtual focal plane determination unit 106 under control of the camera system control unit 108.

After the display-use virtual focal plane determination processing is started, the camera system control unit 108 acquires current lens position information of the image pickup optical system 101 in synchronization with display timing in lens information acquisition (optical information acquisition) in Step S601. The acquired focus lens position is correlated with a position fp of a focal plane (hereinafter referred to simply as "focal plane fp") based on a correspondence table which is registered in advance in the memory (not shown) included in the image pickup apparatus 100.

FIG. 7A is a graph showing an example of a displacement of the focal plane fp at a certain time during the moving image photographing. The vertical axis indicates the position of the focal plane, whereas the horizontal axis indicates time. The dotted line on the graph indicates display timing which is determined uniquely in accordance with a display frame rate. In FIG. 7A, a scene changes between a frame Fr(x) and a frame Fr(x+1). As a result, a rapid operation of the focus lens is brought about to rapidly change the focal plane.

Next, in Step S602, a position of a focal plane most suitable for display (hereinafter referred to as "ideal focal plane") is determined based on the position of the focal plane fp so as to be variable with respect to the focal plane fp. A position ip of the ideal focal plane (hereinafter referred to simply as "ideal focal plane ip") is determined by Expression 1.

$$ip(x)=(fp(x-1)+fp(x))/2 \qquad \text{Expression 1}$$

In Expression 1, x indicates the display timing (frame). Specifically, a value, which is obtained by averaging the focal plane fp(x) at the current display timing and the focal plane fp(x−1) at the last display timing, is calculated as the ideal focal plane ip(x).

FIG. 7B is a graph showing a change of the ideal focal plane ip obtained by using Expression 1 at each display timing shown in FIG. 7A. It is understood that a change rate of the position of the ideal focal plane ip, which is obtained by using Expression 1, is lower than a change rate of the position of the actual focal plane (gradient of the straight line shown in FIG. 7B). Although the example where the ideal focal plane ip is obtained by averaging the actual focal plane fp and the focal plane fp of the last frame has been described, a method of calculating the ideal focal plane ip is not limited thereto. For example, the ideal focal plane ip may also be determined by using moving average processing with a tap number or tap coefficient being varied, as expressed by Expression 2.

$$ip(x)=(fp(x-2)+((fp(x-1))\times 2)+fp(x))/4 \qquad \text{Expression 2}$$

Alternatively, the ideal focal plane ip may be determined by obtaining a root mean square of the positions of the focal plane in a plurality of different frames as expressed by Expression 3.

$$ip(x)=\sqrt{(((fp(x-1))^2+(fp(x))^2)/2)} \qquad \text{Expression 3}$$

Further alternatively, a change amount L of the focal plane, which is allowable for display, may be defined in advance so that the ideal focal plane ip may be determined to limit a change amount of the current focal plane fp within a range of the change amount L.

Further, in this embodiment, the example where the lens position information is used as means for obtaining the position of the focal plane has been described. However, the scope of the present invention is not limited thereto, and other optical information may be used.

Next, a refocusable range is calculated in Step S603.

The refocusing principle is described later in detail. Refocusing processing is realized by combining the imaging data obtained, by groups of the division pixels. Therefore, it can be said that the region over which the imaging data of an image in focus is obtained by the refocusing processing is a range over which an image in focus is obtained by the division pixels. Specifically, the range over which the image looks in focus by the division pixels is a range falling within a depth of field. The division pixels included in the image pickup element 102 in this embodiment are designed so that the exit pupil of the image pickup optical system 101 is divided into two. Therefore, the depth of field, which can be acquired by the division pixels, is a depth of field which is obtained by lowering an F number of the image pickup optical system 101 by one step. In this embodiment, the relationship between the focus lens position, the F number, a focal length, the depth of field, and a depth of focus is held in advance as a table in the memory (not shown) included in the image pickup apparatus 100 so that the depth of field and the depth of focus can be determined uniquely from the focus lens position, the F number, and the focal length.

FIG. 7C is a graph conceptually showing the refocusable range corresponding to FIG. 7A.

A refocusable range Rf_Range is a range of a depth Rf_far from an image plane to the actual focal plane toward a subject and a depth Rf_near from the image plane toward a further rear side.

Next, in Steps S604 to S605, it is determined whether or not the calculated ideal focal plane ip falls within the refocusable range Rf_Range by comparison. In accordance with the result of comparison, a display-use virtual focal plane fp_out is determined as follows.

when ip≥Rf_far holds,
fp_out=Rf_far;
when ip≤Rf_near holds,
fp_out=Rf_hear; and
when Rf_near<ip<Rf_far holds,
fp_out=ip.

According to the determination rule described above, when the ideal focal plane ip falls within the refocusable range, the ideal focal plane ip is determined as the display-use virtual focal plane. When the ideal focal plane ip does not fall within the refocusable range, a limit of the refocusable range is determined as the display-use virtual focal plane.

FIG. 7D is a graph showing a relationship between the refocusable range Rf_Range and the ideal focal plane ip in the plurality of frames shown in FIG. 7A. In FIG. 7D, the ideal focal plane ip has a value smaller than the depth Rf_near in the frame Fr(x+1) and therefore is out of the refocusable range.

FIG. 7E is a graph showing the display-use virtual focal plane fp_out which is determined in accordance with the results of determinations by the comparison in Steps S604 and S605. The display-use virtual focal plane in the frame Fr(x+1) is located at a position Rf_near(x+1). As described above, the display-use virtual focal plane fp_out is determined by the processing in Steps S601 to S605.

Next, in Step S512 of FIG. 5B, processing of generating a refocused image corresponding to the display-use virtual focal plane fp_out is performed, by the refocused image generation unit 107. The refocused image generation processing is realized by the refocused image generation unit 107.

The refocusing principle is now described.

FIGS. 8A to 8F are diagrams illustrating an operation of the refocusing processing.

FIG. 8A illustrates a relationship between incident light on a certain region of the image pickup element 102 and the focal plane at the time of image pickup. FIG. 8A illustrates the incident light when the focal plane is located on an array surface of the microlenses 201 by the solid line, the broken line, or the dotted line for each microlens. On an image pickup plane of the image pickup element at the time of image pickup, an in-focus image is formed. Light beams entering the two division pixels corresponding to each microlens are denoted by the same kind of line. The light fluxes passing through the exit pupil regions 302 and 303 described above referring to FIG. 3 are pupil-divided by the microlenses. The light fluxes passing through the exit pupil region 302 are received by division pixels 802, 801, 806, 808, and 810, whereas the light fluxes passing through the exit pupil region 303 are received by division pixels 801, 803, 805, 807, and 809.

FIG. 8B is a diagram schematically illustrating the light fluxes received respectively by the division pixels in FIG. 8A. By adding a combination of the division pixels 801 and 802, that of the division pixels 803 and 804, that of the division pixels 805 and 806, that of the division pixels 807 and 808, and that of the division pixels 809 and 810 respectively under the same lenses, an image formed by the combination of the light fluxes respectively indicated by the same kinds of line can be obtained.

FIG. 8C is a diagram illustrating a correspondence between the incident light on a virtual focal plane 1 for generating the refocused image and the division pixels. The division pixels 801 to 810 respectively have light-beam information illustrated in FIG. 8A.

FIG. 8D illustrates an example where the refocused image on the virtual focal plane 1 is generated by shifting and adding the image data generated from signals of the light fluxes received as illustrated in FIG. 8A. The imaging data is obtained by combining the light fluxes indicated by the different types of line by shifting and adding the imaging data obtained as illustrated in FIG. 8A. As a result, the obtained imaging data can be treated as data equivalent to image data that can be acquired on the virtual focal plane 1 illustrated in FIG. 8C.

FIGS. 8E and 8F each illustrate an example where the image data is shifted and added in a direction opposite to that in FIGS. 8C and 8D. In this case, the obtained image data can be treated as imaging data equivalent to imaging data obtained on a virtual focal plane 2.

As described above, the refocused image focused on an arbitrary subject region can be generated by using the shift-and-add configuration. By using the refocusing processing, the refocused image corresponding to the display-use virtual focal plane ip determined by the display-use virtual focal plane determination unit 106 of this embodiment is generated.

The refocusing processing has been described with the example where the number of division pixels is two for each microlens. However, the scope of the present invention is not limited thereto. Any number of the division pixels for each microlens is used as long as the refocused image corresponding to the display-use virtual focal plane can be obtained by performing re-combining processing in accordance with a pixel structure such as the number of division pixels or a configuration of the optical system.

Further, the example of the refocusing processing using the simple shift-and-add operation has been described for illustration. However, a method of obtaining the refocused image is not limited thereto. The refocused image on each of the virtual focal planes may be obtained by using another method. For example, processing using weighting addition as described in Japanese Patent Application Laid-Open No. 2007-4471 may be used.

Next, in Step S513, the image processing unit 104 performs predetermined image processing such as resizing on the refocused image generated based on the display-use virtual focal plane to generate an image for display (display data).

Next, in Step S514, the camera system control unit 108 outputs the refocused image for display, which is generated in Step S513, to the display unit 110. Then, the display processing is terminated.

Next, referring to FIG. 5C, the focus adjustment operation performed in Step S405 illustrated in FIG. 4 is described. This operation is performed by the focus detection unit 105 under control of the camera system control unit 108.

After the focus adjustment processing is started, pupil-divided images are generated in Step S521. As described above for the image pickup element 102, the division pixels below the single microlens respectively receive the light fluxes passing through the different regions of the exit pupil. Therefore, by collecting the outputs from the division pixels which have the same positional relationship for each of the microlenses, a pair of pupil-divided images can be obtained.

Next, in Step S522, a correlation operation is performed on the pupil-divided images obtained in Step S521. In the correlation operation, in the periphery of a preset autofocus region, the evaluation value is acquired by integrating an absolute value of a differential value for each set of overlapping pixels while the pair of pupil-divided images are shifted in a horizontal direction. Although the example where the absolute value of the differences between the pixels is used as the evaluation value has been described, the evaluation value may be acquired by a sum of squares of the differential value or other methods.

Next, in Step S523, the image pickup optical system 101 is driven based on a shift amount of the image to a position at which the evaluation value obtained by the correlation operation becomes the smallest, that is, a position at which the matching degree between the pupil-divided images becomes the highest. Then, the focus adjustment processing is completed.

As described above, according to this embodiment, the change rate of the focal plane in the display can be lowered with respect to the change rate of the focal plane based on the driving of the focus lens suitable for focus adjustment. As a result, a moving image can be displayed for a photographer with a small load in recognition of the displayed image while driving the lens in the same manner as in the related art.

Second Embodiment

Figure 10:
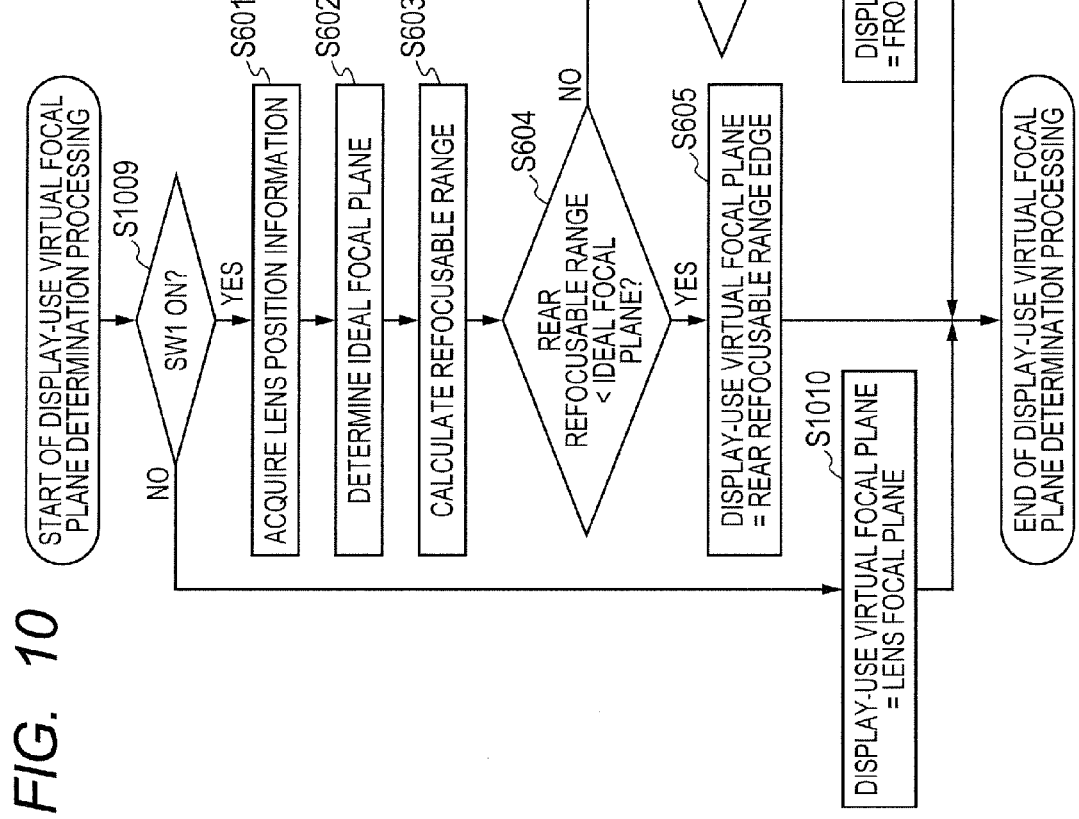
FIG. 10 is a flowchart illustrating a virtual focal plane determination operation according to the second embodiment of the present invention.

Next, a second embodiment of the present invention is described referring to FIGS. 9A to 10.

In the second embodiment, a configuration of controlling the change rate of the focal plane for the display image in a case where a still image is photographed during the moving image photographing performed by the image pickup apparatus 100 described in the first embodiment is described. A configuration of the image pickup apparatus 100 of this embodiment is the same as that of the first embodiment. According to the configuration of this embodiment, when a shutter button (not shown) is half pressed during the moving image photographing operation, a preliminary operation such as autofocusing is performed. When the shutter button is fully pressed, a photographing processing operation for a still image is performed.

FIGS. 9A to 9C are flowcharts respectively illustrating operations of recording processing, display processing, and focus adjustment processing during the moving image photographing operation of this embodiment. FIGS. 9A to 9C correspond to FIGS. 5A to 5C described in the first embodiment. The steps which have already been described are denoted by the same reference symbols, and the detailed description thereof is herein omitted.

First, the operation of the recording processing is described referring to FIG. 9A.

After the recording processing is started, the camera system control unit 108 determines in Step S903 whether or not the shutter button is fully pressed. When the shutter button is fully pressed, the camera system control unit 108 converts the imaging data acquired in Step S402 into data in a predetermined format for compression to generate recording data for a still image in Step S904.

The recording data for a still image, which is generated in Step S904, is stored in the recording medium by the camera system control unit 108 in Step S905. Specifically, when the shutter button is not in the fully pressed state, only the moving image data is recorded. On the other hand, when the shutter button is in the fully-pressed state, control is performed so that the still image data is recorded in addition to the moving image data.

Next, the operation of the display processing illustrated in FIG. 9B is described.

The operation of the display processing of this embodiment is the same as that of the first embodiment except for display-use virtual focal plane determination processing illustrated in Step S911.

FIG. 10 is a flowchart illustrating display-use virtual focal plane determination processing according to this embodiment. FIG. 10 corresponds to FIG. 6 described in the first embodiment. The steps which have already been described are denoted by the same reference symbols, and the detailed description thereof is herein omitted.

After the display-use virtual focal plane determination processing is started in Step S911, the camera system control unit 108 determines in Step S1009 whether or not the shutter button is half pressed. When the shutter button is not in a half-pressed state, the display-use virtual focal plane determination unit 106 determines the display-use virtual focal plane to be located at the same position as that of the actual lens focal plane in Step S1010. In this case, the change rate of the focal plane of the lens is controlled by limiting the amount of driving the lens as illustrated in FIG. 9C.

When the shutter button is in the half-pressed state, the display-use virtual focal plane is determined in Steps S601 to S608 described in the first embodiment. Specifically, when the shutter button is not in the half-pressed state, the focal plane corresponding to the lens position is determined as the display-use virtual focal plane. On the other hand, when the shutter button is in the half-pressed state, the display-use virtual focal plane is controlled so as to be determined within the refocusable range with respect to the lens position.

Next, an operation of the focus adjustment processing illustrated in FIG. 9C is described.

After the focus adjustment processing is started, the lens driving amount from the current lens position to a lens position which is in focus on the subject is calculated in Steps S521 to S523. Next, in Step S925, the camera system control unit 108 determines whether or not the shutter button is in the half-pressed state. When the shutter button is half pressed, the processing proceeds to Step S524. When the shutter button is not in the half-pressed state, the processing proceeds to Step S926 where it is determined whether or not an absolute value of the lens driving amount is smaller than a preset threshold value L. The threshold value L is a threshold value of a lens driving amount which is determined in advance so as to reduce the quality degradation of the moving image due to a rapid operation of the lens, and is stored in the memory (not shown).

When the absolute value of the lens driving amount is smaller than the threshold value L, the processing proceeds to Step S524 where the lens is driven by the lens driving amount calculated in Step S523. Then, the focus adjustment processing is terminated.

When the absolute value of the lens driving amount is equal to or larger than the threshold value L, the processing proceeds to Step S927 where the lens driving amount is overwritten with ±threshold value L. The sign of the threshold value L is determined based on a direction of driving of the lens from the current lens position. For example, a near side is defined as + and an infinity side is defined as −. Then, when an in-focus lens position is on the infinity side of the current lens position and the absolute value of the lens driving amount is equal to or larger than the threshold value L, the lens driving amount is overwritten with −L as the lens driving amount. Similarly, when the in-focus lens position is on the near side of the current lens position and the absolute value of the lens driving amount is equal to or larger than the threshold value L, the lens driving amount is overwritten with +L as the lens driving amount.

Finally, in Step S524, the lens is driven by the lens driving amount. Then, the focus adjustment processing is terminated. Specifically, in this embodiment, when the shutter button is not in the half-pressed state, the lens is driven within the lens driving range of ±L. When the shutter button is in the half-pressed state, the lens is controlled so as to be driven at high speed to the in-focus position.

According to this embodiment described above, in the photographing preliminary operation for a still image (specifically, the half-pressed shutter button state) during the moving image photographing, an image suitable for observation can be displayed for the photographer while the focus adjustment is performed at high speed. On the other hand, when the moving image is being photographed without a command for the photographing preliminary operation, a sudden change of the focal plane is suppressed by limiting the lens driving amount, thereby compensating for image quality of the display image.

Although the configuration of determining the focal plane of the display image by using the display-use virtual focal plane determination processing has been described above in the first and second embodiments, the focal plane determined by the display-use virtual focal plane determination processing can also be used as a focal plane for the recording data. Specifically, the recording data may be generated from the image data of the refocused image generated by the refocused image generation unit 107. In this manner, the image quality of the image displayed when the recording data is reproduced to be displayed can be improved.

The embodiments described above both merely describe embodied examples for carrying out the present invention. Therefore, the technical scope of the present invention should not be read as restrictive by the embodiments described above. Specifically, the present invention can be carried out in various forms without departing from the technical ideas or main characteristics of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s) The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (RPM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-052357, filed Mar. 14, 2014 which is hereby incorporated by reference wherein in its entirety.

What is claimed is:

1. An image processing method for processing image data generated by an image sensor having a plurality of pixels, each pixel having a microlens and a plurality of photoelectric converters including a first photoelectric converter and a second photoelectric converter, the method comprising:
    receiving images of a plurality of frames from the image sensor; and
    generating a recomposed image by adding a first signal obtained by the first photoelectric converter of the plurality of pixels of the image sensor and a second signal obtained by the second photoelectric converter of the plurality of pixels in a state that a position of the second signal is shifted with respect to a position of the first signal, a position of a focal plane of the recomposed image being changed by changing a shift amount of the position of the second signal with respect to the position of the first signal, the focal plane being a plane where light incident on the first photoelectric converter and light incident on the second photoelectric converter are imaged;
    wherein, in a case where the recomposed image is generated from an image of a first frame among images of the plurality of frames received from the image sensor, the position of the focal plane of the recomposed image generated from the image of the first frame is set in accordance with a position of a focal plane corresponding to an image of a second frame different from the first frame among the plurality of frames.

2. The image processing method according to claim 1, wherein
    a change rate of the position of the focal plane corresponding to the images of the plurality of frames after generation of the recomposed image is lower than a change rate of the position of the focal plane of the plurality of frames corresponding to the images of the plurality of frames before generation of the recomposed image.

3. The image processing method according to claim 1, wherein
a change amount of the position of the focal plane corresponding to the images of the plurality of frames after generation of the recomposed image is set to be smaller than a change amount of the position of the focal plane corresponding to the images of the plurality of frames before generation of the recomposed image.

4. The image processing method according to claim 1, wherein
in a case where a difference between the position of the focal point corresponding to the second frame and the position of the focal plane corresponding to the first frame exceeds a predetermined range, the position of the focal plane of the recomposed image is set so that a difference between a first position and a second position is fallen within the predetermined range, wherein the first position is the position of the focal plane corresponding to the second frame or a position of a focal plane of the recomposed image generated from the image of the second frame, and the second position is the position of the focal plane of the recomposed image generated from the image of the first frame.

5. The image processing method according to claim 1, wherein
the second frame is a frame before the first frame,
the position of the focal plane of the recomposed image generated from the image of the first frame is set by performing operation using the position of the focal plane corresponding to the image of the first frame and the position of the focal plane corresponding to the image of the second frame.

6. The image processing method according to claim 5, wherein
an average value obtained by using a position of a focal plane corresponding to the first frame and the position of the focal plane corresponding to the second frame is set as the position of the focal plane of the recomposed image generated by the image of the first frame.

7. The image processing method according to claim 5, wherein
a square root of a root mean square obtained by using a position of a focal plane corresponding to the image of the first frame and the position of the focal plane corresponding to the image of the second frame is set as the position of the focal plane of the recomposed image generated from the image of the first frame.

8. The image processing method according to claim 1, further comprising displaying the recomposed image on a display.

9. An image pickup apparatus comprising:
an image sensor having a plurality of pixels, each pixel having a microlens and a plurality of photoelectric converters including a first photoelectric converter and a second photoelectric converter,
a CPU configured to receive images of a plurality of frames from the image sensor, and generate a recomposed image from at least a part of an image of the images of the plurality of frames,
wherein the CPU generates a recomposed image by adding a first signal obtained by the first photoelectric converter of the plurality of pixels of the image sensor and a second signal obtained by the second photoelectric converter of the plurality of pixels in a state that a position of the second signal is shifted with respect to a position of the first signal, wherein a position of a focal plane of the recomposed image is changed by changing a shift amount of the position of the second signal with respect to the position of the first signal, and the focal plane is a plane where light incident on the first photoelectric converter and light incident on the second photoelectric converter are imaged; and
wherein, in a case where the recomposed image is generated from an image of a first frame among images of the plurality of frames received from the image sensor, the CPU sets the position of the focal plane of the recomposed image generated from the image of the first frame in accordance with a position of a focal plane corresponding to a second frame different from the first frame among the plurality of frames.

* * * * *